(12) United States Patent
Sato et al.

(10) Patent No.: US 6,761,980 B2
(45) Date of Patent: Jul. 13, 2004

(54) METALLIC CATALYST CARRIER

(75) Inventors: Shin Sato, Zama (JP); Ken Oouchi, Yokohama (JP); Kimiyoshi Nishizawa, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/181,151

(22) PCT Filed: Nov. 12, 2001

(86) PCT No.: PCT/JP01/09883
§ 371 (c)(1),
(2), (4) Date: Jul. 15, 2002

(87) PCT Pub. No.: WO02/40156
PCT Pub. Date: May 23, 2002

(65) Prior Publication Data
US 2003/0012973 A1 Jan. 16, 2003

(30) Foreign Application Priority Data
Nov. 15, 2000 (JP) ..................... 2000-347548

(51) Int. Cl.[7] .............................................. B01J 35/04
(52) U.S. Cl. .................... 428/593; 428/596; 428/603; 502/527.22; 422/180; 29/890
(58) Field of Search ................... 428/593, 596, 428/603; 502/527.22; 422/180; 29/890

(56) References Cited

U.S. PATENT DOCUMENTS

| | | | |
|---|---|---|---|
| 4,152,302 A | * 5/1979 | Nonnenmann et al. | ...... 502/338 |
| 4,273,681 A | * 6/1981 | Nonnenmann | ............... 502/338 |
| 4,665,051 A | 5/1987 | Nonnenmann | |
| 4,886,711 A | * 12/1989 | Foldvary | ..................... 428/592 |
| 4,958,428 A | 9/1990 | Humpolik | |
| 4,987,034 A | 1/1991 | Hitachi et al. | |
| 5,045,403 A | 9/1991 | Maus et al. | |
| 5,436,216 A | * 7/1995 | Toyao et al. | ................. 502/439 |
| 5,567,395 A | * 10/1996 | Okabe et al. | ................ 422/180 |
| 5,599,509 A | * 2/1997 | Toyao et al. | ................. 422/180 |
| 5,648,050 A | * 7/1997 | Matsumoto et al. | ......... 422/180 |
| 6,057,263 A | * 5/2000 | Takahashi et al. | ........... 502/439 |

FOREIGN PATENT DOCUMENTS

| | | |
|---|---|---|
| DE | 88 16 137 U1 | 1/1991 |
| DE | 89 09 128 U1 | 9/1991 |
| DE | 42 10 784 A1 | 10/1993 |
| DE | 42 19 673 A1 | 12/1993 |
| EP | 0 186 801 A2 | 5/1987 |
| EP | 0 316 596 A2 | 9/1990 |
| JP | 63-134061 * | 6/1988 |
| JP | 01-242152 * | 9/1989 |
| JP | 5-200309 A1 | 8/1993 |
| JP | 5-309277 A1 | 11/1993 |
| JP | 6-29621 U1 | 4/1994 |
| JP | 6-312141 A1 | 11/1994 |
| JP | 08-001011 * | 1/1996 |
| JP | 8-57673 A1 | 3/1996 |
| JP | 09-047666 * | 2/1997 |
| JP | 10-309471 A1 | 11/1998 |
| JP | 11-047613 * | 2/1999 |
| JP | 2000-061317 * | 2/2000 |

* cited by examiner

Primary Examiner—John J. Zimmerman
(74) Attorney, Agent, or Firm—Shinjyu Global IP Counselors, LLP (57) ABSTRACT

A metallic catalyst carrier 2 has good productivity and improves the exhaust performance by causing the flow of exhaust gas therein to become turbulent, without causing tearing, cutting, and warping of its honeycomb-structure The metallic catalyst carrier 2 has a base metal sheet 5 and a corrugated metal sheet 6 laminated together with a plurality of cell passages 7 formed between the base sheet 5 and the corrugated sheet 6 such that exhaust gases passes through the cell passages 7. The base sheet 5 or the corrugated sheet 6 is equipped with a plurality of hole lines 5a or 6a arranged along hole lines 8 or 9 in a direction perpendicular to the cell passage 7. Between adjacent hole lines 8 or 9, the holes 5a or 6a that form the hole lines 8 or 9 are separated by a prescribed distance in a direction perpendicular to the longitudinal directions of the cell passages 7.

37 Claims, 4 Drawing Sheets

METALLIC CATALYST CARRIER

This application is the national phase under 35 U.S.C. §371 of International Application No. PCT/JP01/09883, which was filed on Nov. 12, 2001 and published in English on May 23, 2002.

BACKGROUND OF THE INVENTION

1. Technical Field

The present invention generally relates to a metallic catalyst carrier used in a catalytic converter for cleaning exhaust gas. More specifically, the present invention relates to a metallic catalyst carrier comprising a flat sheet and a corrugated sheet that are made of metal and laminated together.

2. Description of Related Art

A catalytic converter is used for cleaning exhaust gas. The catalytic converter has an outer casing with a metallic catalyst carrier located therein. The metallic catalyst carrier can be made by stacking and then rolling a corrugated metal sheet and a flat metal sheet together, such as described in Japanese Laid-Open Patent Publication No. 6-312141 is known. This metallic catalyst carrier is divided into a front part and a rear part with the boundary therebetween existing at the slits formed in the corrugated sheet and the flat sheet. The slits formed in the corrugated sheet and the flat sheet extend in the rolling direction of the corrugated sheet and the flat sheet. The front part and the rear part are formed as a result of these slits being formed in mutually corresponding positions. Also, between the front part and the rear part, there exists a connecting part that is a slight portion remaining from the formation of the slits. Thus, the front part and rear part are not completely separated. Rather, the front part and rear part maintain a connected condition via the connecting part. Furthermore, the fragile connecting part is plastically deformed by twisting the front part and the rear part in the circumferential direction with respect to each other. Consequently, a misalignment is formed between the cell passage inside the front part and the cell passage inside the rear part. As a result, exhaust gas that has passed through the front part creates turbulence at the slit area when it flows into the rear part. In this manner, the exhaust gas cleaning performance is improved.

Another type of metallic catalyst carrier is described in Japanese Laid-Open Utility Model Publication No. 6-29621. This type of metallic catalyst carrier comprises a corrugated sheet and a flat sheet rolled together, so as to form a front part, a middle part, and a rear part in the exhaust gas flow direction. Space parts are formed between the front part and middle part, and between the middle part and rear part, respectively. These space parts are constructed by forming two slits in the corrugated sheet and the flat sheet so as to extend in the rolling direction of the corrugated sheet and the flat sheet. The two slits are formed on a portion other than the portion constituting the outermost circumferential part of the carrier, such that the front part, middle part, and rear part are integrated into a single metallic catalyst carrier.

In view of the above, there exists a need for an improved metallic catalyst carrier that effectively improves the exhaust gas cleaning performance. This invention addresses this need in the art as well as other needs, which will become apparent to those skilled in the art from this disclosure.

SUMMARY OF THE INVENTION

It has been discovered that an effective way to improve the exhaust gas cleaning performance is to actively cause turbulence of the exhaust gas passing through the inside of the metallic catalyst carrier. This also increases the chances for the exhaust gas to contact the catalyst. However, in the metallic catalyst carriers previously explained, improvement of the exhaust gas cleaning performance by means of turbulence can only be achieved at the slit portion formed between the front part and the rear part. Consequently, one must widen the slit width or increase the number of slits if one wishes to further improve the exhaust gas cleaning performance.

However, increasing the number of slits means providing many slits that extend in the rolling direction of the corrugated sheet and the flat sheet, and having a carrier structure with multiple parts. Consequently, there is the possibility that warping and cracking will occur during corrugation processing of the corrugated metal sheet, the rolling of the flat sheet and the corrugated sheet together, or twisting of various portions of the carrier in order to cause turbulence. Furthermore, since turbulence is caused by twisting, the carrier in the circumferential direction in front of and behind the slits, improving the exhaust gas cleaning performance by increasing the number of slits will increase the number of times each part is twisted. Therefore, productivity of producing such a metallic catalyst carrier is worsened.

Also, if one attempts to improve the exhaust gas cleaning performance by widening the slit width to strengthen the turbulence of the exhaust gas, the open area ratio of the carrier will be increased and the cleaning performance can be improved. However, when, for example, high pressure exhaust gas passes through suddenly, there is the possibility that buckling will occur due to the connecting parts that cross the slits not being strong enough to be withstand the pressure of the exhaust gas.

Meanwhile, in the latter of the metallic catalyst carriers previously explained, the width of the portions constituting the carrier will be narrowed if many space parts, where turbulence forms, are formed by increasing the number of slits without changing the overall length of the carrier in the exhaust gas flow direction. Consequently, the width of the weld between the corrugated sheet and the flat sheet is narrowed. Accordingly, there is the possibility that the weld portion will come apart under the pressure of high-pressure exhaust gas.

The present invention was conceived in view of these above-mentioned issues. In order to achieve the aforementioned objectives, a metallic catalyst carrier is provided with a flat metal sheet; and a corrugated metal sheet laminated to the flat metal sheet to form a plurality of cell passages that extend longitudinally between the flat metal sheet and the corrugated metal sheet such that exhaust gas passes in a longitudinal direction through the cell passages. One of the flat metal sheet and the corrugated metal sheet has a plurality of elongated holes. Each of the elongated holes has a length being aligned in a lengthwise direction to form a plurality of hole lines arranged in a direction that intersects with the longitudinal directions of the cell passages. The elongated holes in each of the hole lines are separated by a prescribed distance in a direction substantially perpendicular to the longitudinal directions of the cell passages.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following description of the embodiments of the present invention is provided for illustration only, and not for the purpose of limiting the invention as defined by the appended claims and their equivalents.

Figure 1:
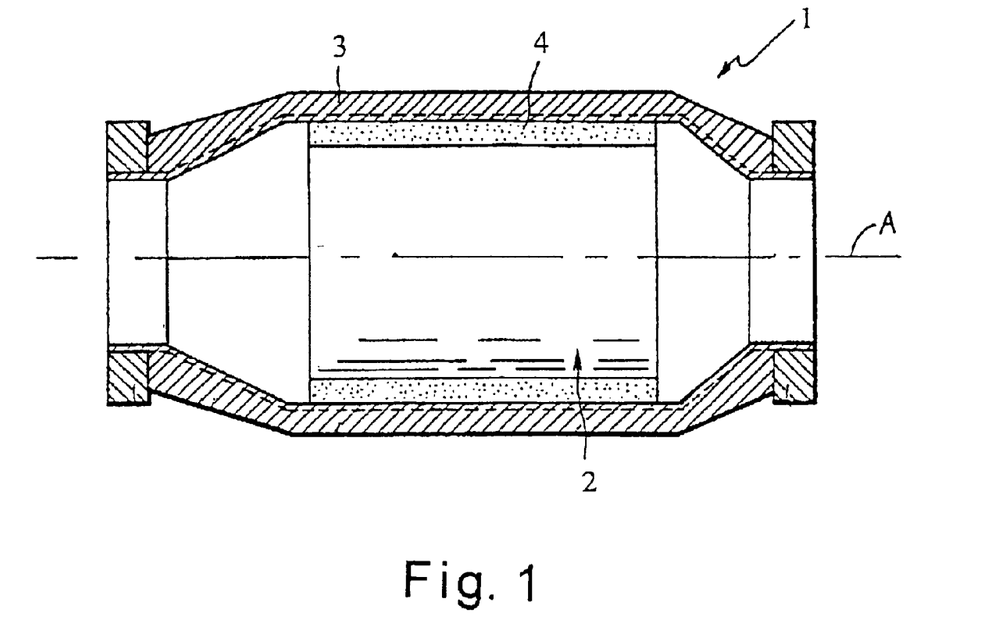
FIG. 1 is a longitudinal cross-sectional view of a catalytic converter with a metallic catalyst carrier mounted therein in accordance with a first embodiment of the present invention.

Referring initially to FIG. 1, a catalytic converter 1 is illustrated with a metallic catalyst carrier 2 mounted therein in accordance with a first embodiment of the present invention. The metallic catalyst carrier 2 has a honeycomb structure, which is assembled inside the case 3 of the catalytic converter 1 with a carrier holding material 4 disposed between the metallic catalyst carrier 2 and the case 3. The catalytic converter 1 with the metallic catalyst carrier 2 disposed therein is provided in the exhaust passage downstream of an internal combustion engine for the purpose of removing harmful substances from the exhaust gas being discharged from the internal combustion engine. Since metallic catalyst carriers have lower heat capacities than ceramic carriers, it is easily heated by the heat of the exhaust gas. Accordingly, the catalyst in the metallic catalyst carrier 2 is quickly activated. Therefore, the metallic catalyst carrier 2 is often placed in the exhaust passage at a position relatively close to the internal combustion engine.

Figure 2:
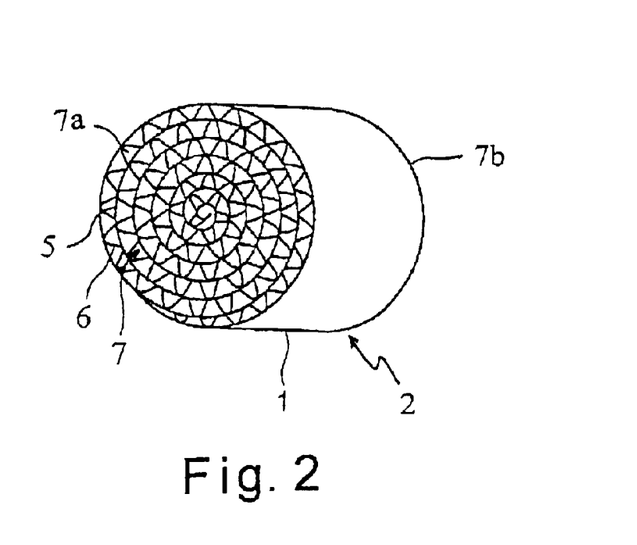
FIG. 2 is an end perspective view of the metallic catalyst carrier illustrated in FIG. 1 in accordance with a first embodiment of the present invention.

As shown in FIG. 2, the metallic catalyst carrier 2 is made by overlaying and rolling up a flat base metal sheet 5 and a corrugated metal sheet 6, to form a large number of substantially triangular cell passages 7 between the base metal sheet 5 and the corrugated metal sheet 6. The cell passages 7 are elongated channels that are substantially parallel to each other. In the illustrated embodiment, the cell passages 7 have longitudinal axes that are parallel to the longitudinal axis A of the catalytic converter 1. Although the metallic catalyst carrier 2 of the illustrated has a cylindrical shape formed by laminating and rolling the flat metal sheet 5 and the corrugated metal sheet 6, it is also acceptable for the metallic catalyst carrier to have other configurations including, but not limited to, the other embodiments illustrated herein.

The base metal sheet 5 is preferably obtained by forming a plurality of holes 5a in a strip-shaped flat metal sheet made of an alloy containing stainless steel and aluminum. The corrugated metal sheet 6 is preferably obtained by providing a plurality of holes 6a in a strip-shaped flat metal sheet made of an alloy containing stainless steel and aluminum and then forming corrugations in the same sheet. Thus, the corrugated metal sheet 6 is made by deforming a flat metal sheet material into a corrugated shape, e.g. a sinusoidal pattern. The holes 5a and 6a formed in the base metal sheet 5 and the corrugated metal sheet 6, respectively, in accordance with this embodiment are described later. In the illustrated embodiment, the base metal sheet 5 is a non-corrugated metal sheet.

The cell passages 7 of the metallic catalyst carrier 4 are configured such that exhaust gas from the internal combustion engine passes longitudinally therethrough. Each of the cell passages 7 has an exhaust gas inlet opening 7a at one longitudinal end, and an exhaust gas discharge outlet 7b at the other longitudinal end. A catalyst (not shown) is carried on the inner surface of the cell passages 7, such that harmful substances are cleaned when exhaust gas passes through the cell passages 7.

If the metallic catalyst carrier 2 were not provided with holes 5a and 6a in the base metal sheet 5 and the corrugated metal sheet 6, respectively, then the exhaust gas that entered through one end of the metallic catalyst carrier 2 would flow through each of the cell passages 7 and would be discharged from the other end of the carrier without being influenced by the exhaust gas passing through other the cell passages 7. In this kind of metallic catalyst carrier, which uses a flat base sheet and the corrugated sheet without holes, if the cell passages are long the flow of the exhaust gas inside the cell passages will become laminar and the chances for the harmful substances in the exhaust gas to contact the catalyst components will be smaller. Consequently, there is the risk that the exhaust gas cleaning performance will be reduced.

Conversely, when the holes 5a or 6a are provided in either or both of the base metal sheet 5 and the corrugated metal sheet 6, then the holes 5a and/or 6a in the cell passages 7 form flow paths that allow exhaust gas to flow between the adjacent cell passages 7. In other words, the exhaust gas can move freely between the adjacent cell passages 7 via the holes 5a and/or 6a. More specifically, the exhaust gas enters through the inlet openings 7a of the cell passages 7 and flows into the adjacent cell passages 7 through the holes 5a and/or 6a as the exhaust gas passes through the cell passages 7. Consequently, the flows of exhaust gas in adjacent cell passages 7 are influence by each other so as to cause turbulence to occur inside the cell passages 7. When the flow of exhaust gas is turbulent, the exhaust gas cleaning performance can be improved because the chances for the harmful substances in the exhaust gas to contact the catalyst increase.

Figure 4:
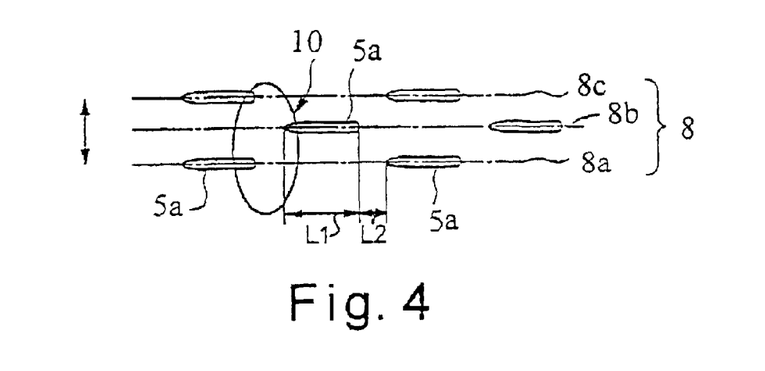
FIG. 4 is a diagrammatic illustration of the positioning of the holes in the unrolled state of the flat metal sheet that form a part of the metallic catalyst carrier illustrated in FIGS. 1–3 of the present invention.

In one preferred embodiment of the present invention, which is illustrated in FIGS. 1 and 2, the holes 5a are arranged to form a plurality of hole lines 8 formed in the base sheet 5 as shown in FIG. 4. The hole lines 8 form a group of parallel lines 8a, 8b, 8c, etc. having a predetermined spacing between adjacent pairs of hole lines 8 in the longitudinal direction of the cell passages 7. The hole lines 8 extend substantially perpendicular to the longitudinal axes of the cell passages 7. Preferably, each of the holes 5a is an elongated slit that is arranged to extend in a direction substantially perpendicular to the longitudinal axes of the cell passages 7. In other words, the holes 5a are arranged lengthwise along the hole lines 8, respectively.

The length L1 each of the holes 5a is approximately three times longer than the prescribed spacing or distance L2 from the closest hole in the adjacent hole line. Therefore, the length L1 is sufficiently longer than the prescribed distance L2. Furthermore, the holes 5a that constitute adjacent hole lines 8 are provided so that they do not overlap when viewed along the longitudinal axes of the cell passages 7, as shown in the encircled portion indicated as 10. Also, as seen in FIG. 4, the holes 5a that form the hole line 8a and the holes 5a that form the hole line 8c, which is not adjacent to but one line away from the hole line 8a, are arranged so that they overlap when along the longitudinal axes of the cell passages 7. Therefore, the chances for the flow of the exhaust gas passing through the cell passages 7 to become turbulent can be increased even further. As a result, the exhaust gas cleaning performance can be reliably improved.

Figure 5:
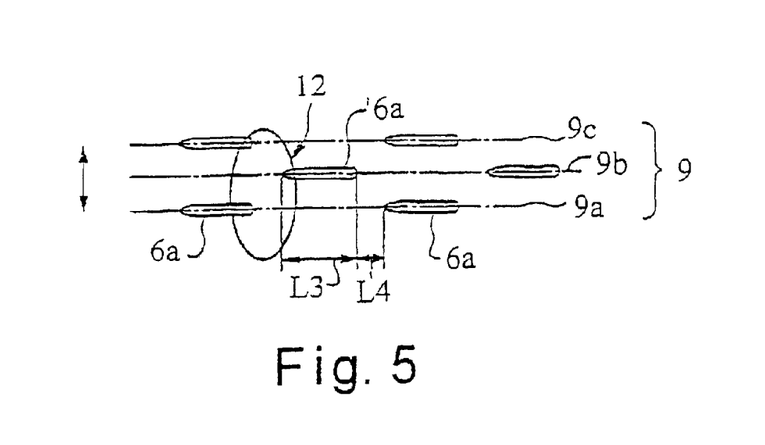
FIG. 5 is a diagrammatic illustration of the positioning of the holes in the unrolled state of the corrugated metal sheet that form a part of the metallic catalyst carrier illustrated in FIGS. 1–3.

Likewise, the holes 6a are arranged to form a plurality of hole lines 9 formed in the corrugated sheet 6 as shown in FIG. 5. The hole lines 9 form a group of parallel lines 9a, 9b, 9c, etc. having a predetermined spacing between adjacent pairs of hole lines 9 in the longitudinal direction of the cell passages 7. The hole lines 9 extend substantially perpendicular to the longitudinal axes of the cell passages 7. Preferably, each of the holes 6a is an elongated slit or opening that is arranged to extend in a direction substantially perpendicular to the longitudinal axes of the cell passages 7. In other words, the holes 6a are arranged lengthwise along the hole lines 9, respectively.

Figure 3:
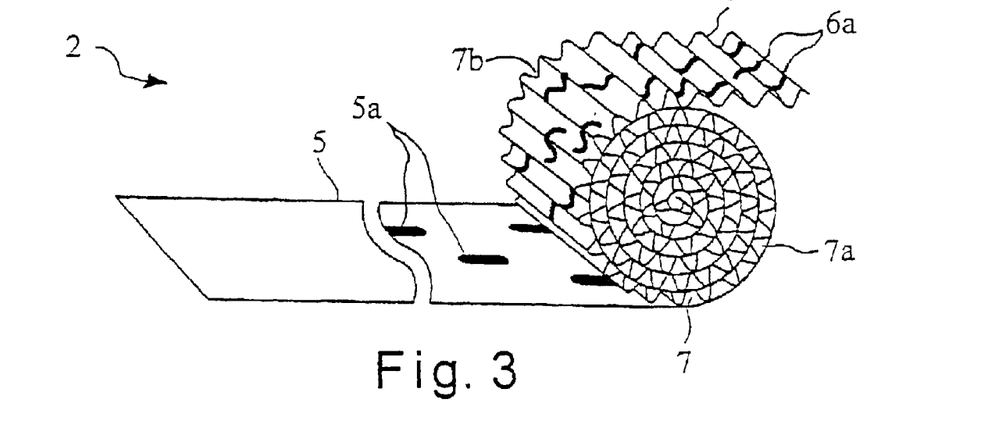
FIG. 3 is a diagrammatic perspective view of the metallic catalyst carrier illustrated in FIG. 1 showing the construction of the metallic catalyst carrier in accordance with the present invention.

The length L3 each of the holes 6a is approximately three times longer than the prescribed spacing or distance L4 from the closest hole in the adjacent hole line. Therefore, the length L3 is sufficiently longer than the prescribed distance L4. In the illustrated embodiment, the lengths L1 and L3 of the holes 5a and 6a are approximately equal, and the spacings L2 and L4 are also approximately equal. Furthermore, the holes 6a that constitute adjacent hole lines 9 are provided so that they do not overlap when viewed along the longitudinal axes of the cell passages 7, as shown in the encircled portion indicated as 12. Also, as seen in FIG. 5, the holes 6a that form the hole line 9a and the holes 6a that form the hole line 9c, which is not adjacent to but one line away from the hole line 9a, are arranged so that they overlap when viewed along the longitudinal axes of the cell passages 7. The hole lines 8 and 9 of the metallic catalyst carrier 2 are illustrated as being offset from each other as seen in FIG. 3 such that the holes 5a and 6b are not aligned. However, the hole lines 8 and 9 of the metallic catalyst carrier 2 can be aligned with each other as needed and/or desired. Moreover, the holes 5a and 6b of the closest adjacent hole lines 8 and 9 can be either aligned or offset as needed and/or desired. Preferably, the holes 5a and 6b of the closest adjacent hole lines 8 and 9 are offset as seen in FIG. 3.

Therefore, tears, cuts and twisting in the vicinity of the holes 6a of the corrugated sheet 6 can be prevented when the corrugations are formed in the corrugated sheet 6 and when the base sheet 5 and the corrugated sheet 6 are laminated and rolled up together. Additionally, exhaust gas turbulence occurs inside the cell passages 7 due to the unique arrangement of holes 5a and/or 6a. As a result, the chances for the harmful substances in the exhaust gas to react with the catalyst are increased, and the exhaust gas cleaning performance can be improved.

COMPARATIVE EXAMPLE

Figure 6:
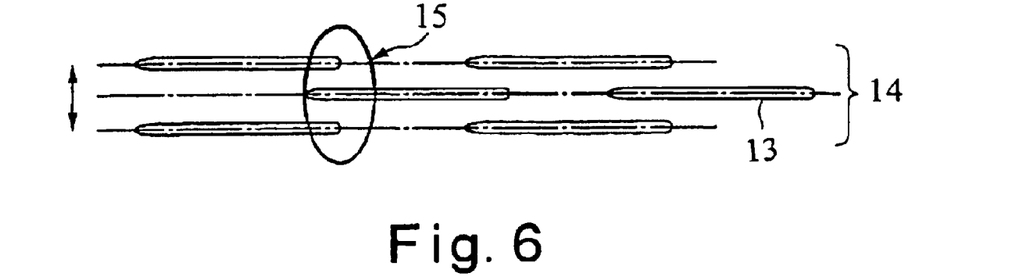
FIG. 6 is a diagrammatic illustration of a comparative example of the positioning of the holes in the metal sheets that constitute the metallic catalyst carrier.

A hole pattern of holes 13 for a corrugated sheet is shown in FIG. 6. This hole pattern is a comparative example to illustrated the problems with a corrugated sheet having holes 13 that are overlap when viewed along the longitudinal axes of the cell passages. In this comparative example, in order to increase the chances that the exhaust passing through the cell passages will meet the holes 13 provided in the corrugated sheet and to enable the generation of much turbulence inside the cell passages, the holes 13 are elongated slits that extend substantially perpendicular to the longitudinal axes of the cell passages. Accordingly, the hole lines 14 are formed by the holes 13. As previously mentioned, the end positions of the holes 13 in the corrugated sheet are arranged such that adjacent holes 13 overlap when viewed along the longitudinal axes of the cell passages, as shown in the portion indicated by circle 15 in FIG. 6.

However, with this comparative example of FIG. 6, such problems as tears, cuts and twisting in the vicinity of the holes 13 in the corrugated sheet occurred when corrugations were formed in the corrugated sheet or when the corrugated sheet was laminated to and rolled up with the base sheet after the hole lines 13 were formed.

After being rolled into a cylindrical shape, the corrugated sheet 6 and the base sheet 7 are joined to obtain the metallic catalyst carrier 2. Typically, brazing materials and welding jigs are utilized in joining. However, with these methods, since the base sheet 5 and the corrugated sheet 6 have the slit holes 5a and 6a, there have to be portions that can be joined while avoiding the slit holes 5a and 6a. Consequently, there is the possibility that productivity will decline. Therefore, it is preferable for the metallic catalyst carrier 2 in accordance with the present invention to be joined using diffusion welding, in which joining is accomplished by conducting high-temperature heating under a strong vacuum or in a non-oxidizing atmosphere.

Second Embodiment

Figure 7:
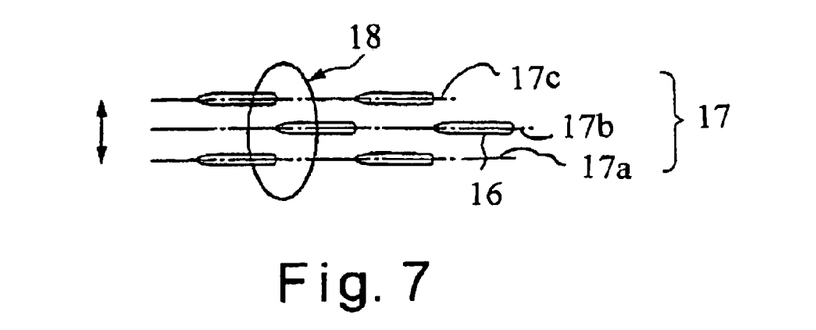
FIG. 7 is a diagrammatic illustration of the positioning of the holes in the unrolled state of the metal sheets that form a metallic catalyst carrier in accordance with a second embodiment of the present invention.

Referring now to FIG. 7, a hole pattern of holes 16 is illustrated in accordance with a second embodiment for either the base sheet 5 or the corrugated sheet 6, or both. In other words, the metallic catalyst carrier 2 of the catalytic converter 1 illustrated in FIGS. 1–3 is modified such that either the base sheet 5 or the corrugated sheet 6, or both, has the hole pattern illustrated in FIG. 7.

Similar to the hole pattern of the first embodiment, the holes 16 are arranged to form a plurality of hole lines 17 formed in either the base sheet 5 or the corrugated sheet 6, or both. The hole lines 17 form a group of parallel lines 17a, 17b, 17c, etc. having a predetermined spacing between adjacent pairs of hole lines 17 in the longitudinal direction of the cell passages 7. The hole lines 17 extend substantially perpendicular to the longitudinal axes of the cell passages. Preferably, each of the holes 16 is an elongated slit that arranged to extend in a direction substantially perpendicular to the longitudinal axes of the cell passages 7. In other words, the holes 16 are arranged lengthwise along the of hole lines 17.

In this second embodiment, the holes 16 formed in the base sheet 5 and/or the corrugated sheet 6 do not overlap viewed along the longitudinal axes of the cell passages 7 as shown in the encircled portion 18 in FIG. 7. In other words, as shown in the encircled portion 18, the adjacent ends of the closest holes 16 of adjacent hole lines 17 are aligned along straight line 19. Thus, the adjacent ends of the closest holes 16 of adjacent hole lines touch on the straight line 19, which is oriented substantially parallel to the longitudinal axes of the cell passages 7. Therefore, in this second embodiment, turbulence of the exhaust gas is generated reliably when the exhaust gas passes through the cell passages 7 because the holes 17 exist in all the cell passages 7. As a result, in addition to the effects of the first embodiment, the exhaust gas cleaning performance can be improved even further.

Third Embodiment

Figure 8:
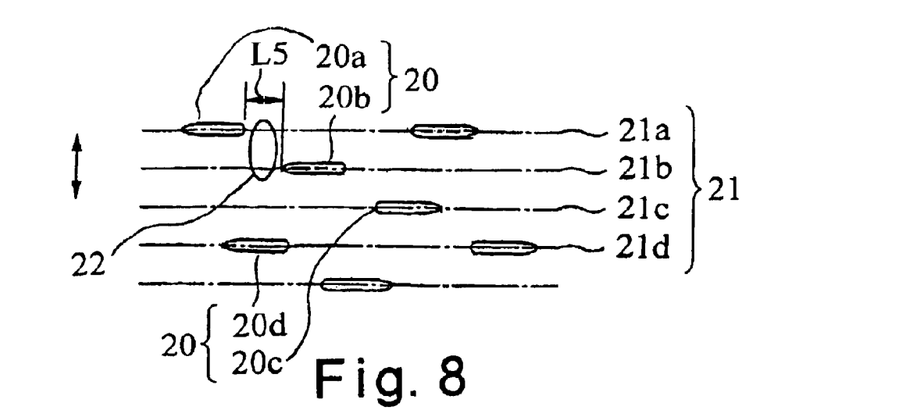
FIG. 8 is a diagrammatic illustration of the positioning of the holes in the unrolled state of the metal sheets that form the metallic catalyst carrier in accordance with a third embodiment of the present invention.

Referring now to FIG. 8, a hole pattern of holes 20 is illustrated in accordance with a third embodiment for either the base sheet 5 or the corrugated sheet 6, or both. In other words, the metallic catalyst carrier 2 of the catalytic converter 1 illustrated in FIGS. 1–3 is modified such that either the base sheet 5 or the corrugated sheet 6, or both, has the hole pattern illustrated in FIG. 8.

Similar to the hole pattern of the first embodiment, the holes 20 are arranged to form a plurality of hole lines 21 formed in either the base sheet 5 or the corrugated sheet 6, or both. The hole lines 21 form a group of parallel lines 21a, 21b, 21c, 21d, etc. having a predetermined spacing between adjacent pairs of hole lines 21 in the longitudinal direction of the cell passages. The holes 20 form a group of holes 20a, 20b, 20c, 20d, etc. that are formed on the hole lines 21, 21b, 21c, 21d, etc. respectively. The hole lines 21 extend substantially perpendicular to the longitudinal axes of the cell passages 7. Preferably, each of the holes 20 is an elongated slit that arranged to extend in a direction substantially perpendicular to the longitudinal axes of the cell passages 7. In other words, the holes 20 are arranged lengthwise along the hole lines 21.

In third embodiment of the present invention shown in FIG. 8, a first elongated hole 20a in a first adjacent hole line 21a and the closest hole or a second elongated hole 20b in a second adjacent hole line 21b are separated by a prescribed distance L5 in the direction perpendicular to the cell passage 7, i.e., in the lengthwise direction of the holes 20. In other words, each of the continuous portions 22 of the base sheet 5 or the corrugated sheet 6 between the adjacent holes 20a and 20b of the hole lines 21a and 21b, respectively, has a prescribed distance or length L5. When one of the continuous portions 22 is viewed along the longitudinal axes of the cell passages 7, a hole 20d of a non-adjacent hole line 21d overlaps with the continuous portion 22 formed between the hole 20a in the hole line 21a and the closest hole 20b in the hole line 21b. The hole line 21d is different from hole line 21a or hole line 21b and is not adjacent to either hole line 21a or hole line 21b. More specifically, the hole line 21d is not the hole line 21c that is adjacent to the hole line 21b, but is rather one line away from the hole line 21b.

Thus, similarly to the second embodiment, the third embodiment is formed such that the holes 20 of the adjacent hole lines 21 do not overlap exist when viewed alone the longitudinal axes of the cell passages 7. Moreover, similarly to the second embodiment, when viewed along the longitudinal axes of the cell passages 7, the holes 20 of the third embodiment continuously exists in the direction perpendicular to the longitudinal axes of the cell passages 7. In other words, at least one the hole 20 exists in every the cell passage 7 formed by laminating the base sheet 5 and the corrugated sheet 6, and these the holes 20 connect the adjacent cell passages 7. Therefore, the exhaust gas cleaning performance can be improved because turbulence of the exhaust gas is generated reliably when the exhaust gas passes through the cell passages 7. Accordingly, chances for reaction with the catalyst are provided.

Fourth Embodiment

Figure 9:
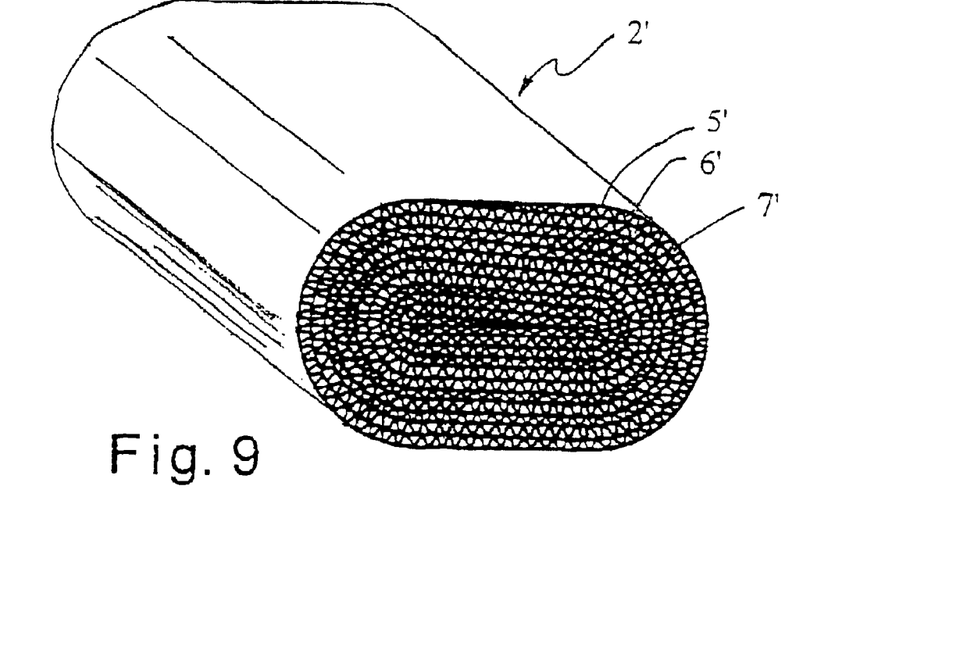
FIG. 9 is an end perspective view of a metallic catalyst carrier in accordance with a fourth embodiment of the present invention.

Referring now to FIG. 9, the metallic catalyst carrier 2' is illustrated in accordance with a fourth embodiment. Basically, the metallic catalyst carrier 2' is identical to the first embodiment, except that the overall shape of the metallic catalyst carrier 2' is elliptical or racetrack shaped. Thus, the metallic catalyst carrier 2' is made by overlaying and rolling up a base metal sheet 5' and a corrugated metal sheet 6', so that a large number of substantially triangular the cell passages 7' are formed between the base metal sheet 5' and the corrugated metal sheet 6'. The hole patterns of the base metal sheet 5' and the corrugated metal sheet 6' are arranged according to any one of the first three embodiments. In view of the similarity between this embodiment and the prior embodiments, the descriptions of the parts of this embodiment will be omitted for the sake of brevity.

Fifth Embodiment

Figure 10:
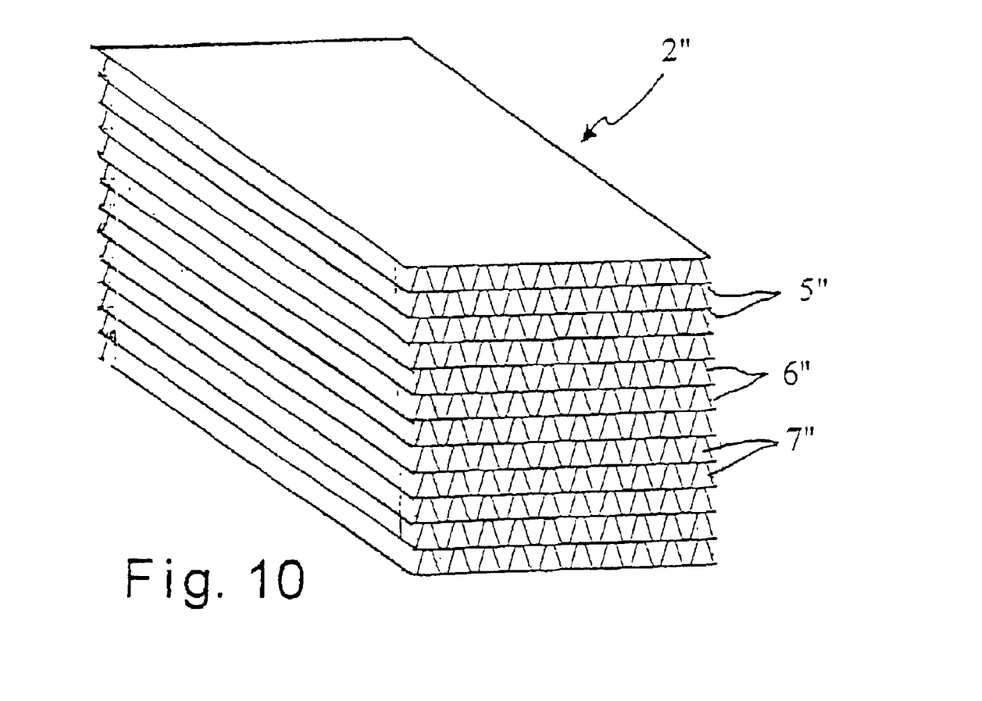
FIG. 10 is an end perspective view of a metallic catalyst carrier in accordance with a fifth embodiment of the present invention.

Referring now to FIG. 9, the metallic catalyst carrier 2' is illustrated in accordance with a fifth embodiment. Basically, the metallic catalyst carrier 2' is identical to the first embodiment, except that the metallic catalyst carrier 2' is formed by simply stacking several layers of identical flat base metal sheets 5' and identical corrugated sheets 6' in an alternating manner to form a stacked metallic catalyst carrier 2'. Preferably, the overall shape of the metallic catalyst carrier 2' is rectangular. Thus, the metallic catalyst carrier 2 is made by stacking several layers of the base metal sheet 5' and the corrugated metal sheet 6', so that a large number of substantially triangular the cell passages 7' are formed between the base metal sheet 5' and the corrugated metal sheet 6'. The hole patterns of the base metal sheet 5' and the corrugated metal sheet 6' are arranged according to any one of the first three embodiments. In view of the similarity between this embodiment and the prior embodiments, the descriptions of the parts of this embodiment will be omitted for the sake of brevity.

In the embodiments discussed heretofore, the holes were preferably provided in both the base sheet and the corrugated sheet and the slit holes were arranged as described previously. However, it is clear that tears, cuts and twisting in the vicinity of the slit holes can be prevented and turbulence of the exhaust gas can be generated to improve the exhaust gas cleaning performance even in the case of a metallic catalyst carrier in which only the corrugated sheet or the base sheet is provided with the slit holes arranged as described previously.

Also, although the slit holes are provided in the base sheet as well as in the corrugated sheet, there is no step for forming corrugations in the flat sheet. Therefore, the flat sheet develops tears, cuts, and twisting less easily than the corrugated sheet when it is laminated and rolled with the corrugated sheet 6. Consequently, even when the base sheet allows the slit holes of adjacent hole lines to be arranged relatively freely so as to overlap when viewed from the cell passage direction, cuts and twisting occur infrequently.

With a conventional multi-step metallic catalyst carrier in which improvement of the exhaust gas cleaning performance is contrived by causing turbulence in the exhaust gas flow, it can become very expensive when one attempts to change the characteristics of the exhaust gas cleaning performance in order to accommodate the engine performance or other conditions. The reason is that changes must be made to such factors as the width or cross sectional size of each metallic catalyst carrier parts and the volume of the space between parts. In some cases, the size of the catalytic converter itself might have to be changed.

With the metallic catalyst carriers presented in the embodiments of the present, invention, however, the exhaust gas cleaning performance can be changed by simply changing the positions and number of the holes. Therefore, even when the cleaning performance characteristic is to be changed, the change can be accomplished while maintaining good productivity and holding costs down.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents. Thus, the scope of the invention is not limited to the disclosed embodiments.

What is claimed is:

1. A metallic catalyst carrier comprising:
   a base metal sheet; and
   a corrugated metal sheet laminated to the base metal sheet to form a plurality of cell passages that extend longitudinally between the base metal sheet and the corrugated metal sheet such that exhaust gas passes in a longitudinal direction through the cell passages,
   one of the base metal sheet and the corrugated metal sheet having a plurality of elongated holes, each of the elongated holes having a length being aligned in a lengthwise direction to form a plurality of hole lines including at least first and second adjacent hole lines and a non-adjacent hole line that is not adjacent to either one of the first and second adjacent hole lines, the first and second adjacent hole lines and non-adjacent hole line being arranged in a direction that intersects with the longitudinal directions of the cell passages, the elongated holes in each of the hole lines being separated by a prescribed distance in a direction substantially perpendicular to the longitudinal directions of the cell passages, the first and second adjacent hole lines including first and second adjacent elongated holes, respectively, that are spaced apart in a direction substantially perpendicular to the longitudinal directions of the cell passages to form a continuous portion therebetween, the non-adjacent hole line including at least one of the elongated holes disposed to overlap with the continuous portion when viewed along the longitudinal directions of the cell passages such that at least one of the elongated holes is disposed in each of the cell passages.

2. The metallic catalyst carrier as recited in claim 1, wherein
   the elongated holes are formed in the corrugated metal sheet.

3. The metallic catalyst carrier as recited in claim 2, wherein
   the base metal sheet includes a plurality of holes.

4. The metallic catalyst carrier as recited in claim 3, wherein
   the holes of the base metal sheet are elongated holes.

5. The metallic catalyst carrier as recited in claim 3, wherein
   the holes of the base metal sheet are arranged in a pattern that is substantially identical to the holes of the corrugated metal sheet.

6. The metallic catalyst carrier as recited in claim 1, wherein
   non-adjacent ones of the hole lines include at least one pair of the elongated holes that overlaps when viewed along the longitudinal directions of the cell passages.

7. The metallic catalyst carrier as recited in claim 1, wherein
   the first and second elongated holes of the first and second adjacent hole lines and the at least one of the elongated holes of the non-adjacent hole line are arranged in a repeating pattern such that at least one of the elongated holes is disposed in each of the cell passages when viewed along the longitudinal direction of the cell passages to fluidly couple adjacent ones of the cell passages.

8. The metallic catalyst carrier as recited in claim 1, wherein
   the elongated holes are formed in the base metal sheet.

9. The metallic catalyst carrier as recited in claim 8, wherein
   the corrugated metal sheet includes a plurality of holes.

10. The metallic catalyst carrier as recited in claim 9, wherein
    the holes of the corrugated metal sheet are elongated holes.

11. The metallic catalyst carrier as recited in claim 9, wherein
    the elongated holes of adjacent ones of the hole lines do not overlap when viewed along the longitudinal directions of the cell passages.

12. The metallic catalyst carrier as recited in claim 8, wherein
    the first and second elongated holes of the first and second adjacent hole lines and the at least one of the elongated holes of the non-adjacent hole line are arranged in a repeating pattern such that at least one of the elongated holes is disposed in each of the cell passages when viewed along the longitudinal direction of the cell passages to fluidly couple adjacent ones of the cell passages.

13. The metallic catalyst carrier as recited in claim 1, wherein
    the base metal sheet and the corrugated metal sheet are rolled into a cylindrical configuration.

14. The metallic catalyst carrier as recited in claim 1, wherein
    the base metal sheet and the corrugated metal sheet are rolled into an elliptical configuration.

15. A metallic catalyst carrier comprising:

a base metal sheet; and a corrugated metal sheet laminated to the base metal sheet to form a plurality of cell passages that extend longitudinally between the base metal sheet and the corrugated metal sheet such that exhaust gas passes in a longitudinal direction through the cell passages, one of the base metal sheet and the corrugated metal sheet having a plurality of elongated holes, each of the elongated holes having a length being aligned in a lengthwise direction to form a plurality of hole lines arranged in a direction that intersects with the longitudinal directions of the cell passages, and the elongated holes in each of the hole lines being separated by a prescribed distance in a direction substantially perpendicular to the longitudinal directions of the cell passages, the base metal sheet and the corrugated metal sheet being stack together with a plurality of additional base metal sheets alternating with a plurality of additional corrugated metal sheets to form a stack with a plurality of layers of the cell passages, the additional base metal sheets being identical to the base metal sheet and the additional corrugated metal sheets being identical to the corrugated metal sheet.

16. A metallic catalyst carrier comprising:

a base metal sheet; and a corrugated metal sheet laminated to the base metal sheet to form a plurality of cell passages that extend longitudinally between the base metal sheet and the corrugated metal sheet such that exhaust gas passes in a longitudinal direction through the cell passages, one of the base metal sheet and the corrugated metal sheet having a plurality of holes, each of the holes being aligned to form a plurality of hole lines including at least first and second adjacent hole lines and a non-adjacent hole line that is no adjacent to either one of the first and second adjacent hole lines, the first and second adjacent hole lines and non-adjacent hole line being arranged in a direction that extends substantially perpendicular to the longitudinal directions of the cell passages, the holes of adjacent ones of the hole lines do not overlap when viewed along the longitudinal directions of the cell passages, the first and second adjacent hole lines including first and second adjacent holes, respectively, that are spaced apart in a direction substantially perpendicular to the longitudinal directions of the cell passages to form a continuous portion therebetween, the non-adjacent hole line including at least one of the holes disposed to overlap with the continuous portion when views alone the longitudinal directions of the cell passages.

17. The metallic catalyst carrier as recited in claim 16, wherein the holes are formed in the corrugated metal sheet.

18. The metallic catalyst carrier as recited in claim 16, wherein the holes are formed in the base metal sheet.

19. The metallic catalyst carrier as recited in claim 16, wherein non-adjacent ones of the hole lines include at least one pair of the holes that overlaps when viewed along the longitudinal directions of the cell passages.

20. The metallic catalyst carrier as recited in claim 16, wherein the first and second holes of the first and second adjacent hole lines and the at least one of the holes of the non-adjacent hole line are arranged in a repeating pattern such that at least one of the holes is disposed in each of the cell passages when viewed along the longitudinal direction of the cell passages to fluidly couple adjacent ones of the cell passages.

21. The metallic catalyst carrier as recited in claim 16, wherein the base metal sheet and the corrugated metal sheet are rolled into a cylindrical configuration.

22. The metallic catalyst carrier as recited in claim 16, wherein the base metal sheet and the corrugated metal sheet are rolled into an elliptical configuration.

23. A metallic catalyst carrier comprising:

a base metal sheet; and a corrugated metal sheet laminated to the base metal sheet to form a plurality of cell passages that extend longitudinally between the base metal sheet and the corrugated metal sheet such that exhaust gas passes in a longitudinal direction through the cell passages, one of the base metal sheet and the corrugated metal sheet having a plurality of holes, each of the holes being aligned to form a plurality of hole lines arranged in a direction that extends substantially perpendicular to the longitudinal directions of the cell passages, and the holes of adjacent ones of the hole lines do not overlap when viewed along the longitudinal directions of the cell passages, the base metal sheet and the corrugated metal sheet being stack together with a plurality of additional base metal sheets alternating with a plurality of additional corrugated metal sheets to form a stack with a plurality of layers of the cell passages, the additional base metal sheets being identical to the base metal sheet and the additional corrugated metal sheets being identical to the corrugated metal sheet.

24. A metallic catalyst carrier comprising:

a base metal sheet; and a corrugated metal sheet laminated to the base metal sheet to form a plurality of cell passages that extend longitudinally between the base metal sheet and the corrugated metal sheet such that exhaust gas passes in a longitudinal direction through the cell passages, one of the base metal sheet and the corrugated metal sheet having a plurality of elongated holes, each of the elongated holes having a length being aligned in a lengthwise direction to form a plurality of hole lines including at least first and second adjacent hole lines and a non-adjacent hole line that is not adjacent to either one of the first and second adjacent hole lines, the first and second adjacent hole lines and non-adjacent hole line being arranged in a direction that intersects with the longitudinal directions of the cell passages, the elongated holes of adjacent ones of the hole lines do not overlap when viewed along the longitudinal directions of the cell passages, the first and second adjacent hole lines including first and second adjacent elongated holes, respectively, that are spaced apart in a direction substantially perpendicular to the longitudinal directions of the cell passages to form a continuous portion therebetween, the non-adjacent hole line including at least one of the elongated holes disposed to overlap with the continuous portion when viewed alone the longitudinal directions of the cell passages.

25. The metallic catalyst carrier as recited in claim 24, wherein
the elongated holes are formed in the corrugated metal sheet.

26. The metallic catalyst carrier as recited in claim 25, wherein
the base metal sheet includes a plurality of holes.

27. The metallic catalyst carrier as recited in claim 26, wherein
the holes of the base metal sheet are elongated holes.

28. The metallic catalyst carrier as recited in claim 26, wherein
the holes of the base metal sheet are arranged in a pattern that is substantially identical to the holes of the corrugated metal sheet.

29. The metallic catalyst carrier as recited in claim 24, wherein
non-adjacent ones of the hole lines include at least one pair of the elongated holes that overlaps when viewed along the longitudinal directions of the cell passages.

30. The metallic catalyst carrier as recited in claim 24, wherein
the first and second elongated holes of the first and second adjacent hole lines and the at least one of the elongated holes of the non-adjacent hole line are arranged in a repeating pattern such that at least one of the elongated holes is disposed in each of the cell passages when viewed along the longitudinal direction of the cell passages to fluidly couple adjacent ones of the cell passages.

31. The metallic catalyst carrier as recited in claim 24, wherein
the elongated holes are formed in the base metal sheet.

32. The metallic catalyst carrier as recited in claim 31, wherein
the corrugated metal sheet includes a plurality of holes.

33. The metallic catalyst carrier as recited in claim 32, wherein
the holes of the corrugated metal sheet are elongated holes.

34. The metallic catalyst carrier as recited in claim 31, wherein
the first and second elongated holes of the first and second adjacent hole lines and the at least one of the elongated holes of the non-adjacent hole line are arranged in a repeating pattern such that at least one of the elongated holes is disposed in each of the cell passages when viewed along the longitudinal direction of the cell passages to fluidly couple adjacent ones of the cell passages.

35. The metallic catalyst carrier as recited in claim 24, wherein
the base metal sheet and the corrugated metal sheet are rolled into a cylindrical configuration.

36. The metallic catalyst carrier as recited in claim 24, wherein
the base metal sheet and the corrugated metal sheet are rolled into an elliptical configuration.

37. A metallic catalyst carrier comprising:

a base metal sheet; and a corrugated metal sheet laminated to the base metal sheet to form a plurality of cell passages that extend longitudinally between the base metal sheet and the corrugated metal sheet such that exhaust gas passes in a longitudinal direction through the cell passages, one of the base metal sheet and the corrugated metal sheet having a plurality of elongated holes, each of the elongated holes having a length being aligned in a lengthwise direction to form a plurality of hole lines arranged in a direction that intersects with the longitudinal directions of the cell passages, and the elongated holes of adjacent ones of the hole lines do not overlap when viewed along the longitudinal directions of the cell passages, the base metal sheet and the corrugated metal sheet being stack together with a plurality of additional base metal sheets alternating with a plurality of additional corrugated metal sheets to form a stack with a plurality of layers of the cell passages, the additional base metal sheets being identical to the base metal sheet and the additional corrugated metal sheets being identical to the corrugated metal sheet.

* * * * *